US012330868B2

(12) United States Patent
Kappers et al.

(10) Patent No.: US 12,330,868 B2
(45) Date of Patent: Jun. 17, 2025

(54) LARGE CAB INNOVATIONS

(71) Applicant: Oshkosh Corporation, Oshkosh, WI (US)

(72) Inventors: Jerrod Kappers, Oshkosh, WI (US); Vincent Hoover, Byron, MN (US); Joshua D. Rocholl, Rochester, MN (US); Logan Gary, Oshkosh, WI (US); Jacob Solberg, Oshkosh, WI (US); David Giere, Oshkosh, WI (US); Emily Davis, Oshkosh, WI (US); Zachary Klein, Rochester, MN (US); Derek Wente, Austin, MN (US); Vince Schad, Oshkosh, WI (US); Clinton Weckwerth, Pine Island, WI (US)

(73) Assignee: Oshkosh Corporation, Oshkosh, WI (US)

(*) Notice: Subject to any disclaimer, the term of this patent is extended or adjusted under 35 U.S.C. 154(b) by 403 days.

(21) Appl. No.: 17/673,360

(22) Filed: Feb. 16, 2022

(65) Prior Publication Data

US 2022/0258965 A1    Aug. 18, 2022

Related U.S. Application Data

(60) Provisional application No. 63/150,375, filed on Feb. 17, 2021.

(51) Int. Cl.
*B65F 3/04* (2006.01)
*B60H 1/24* (2006.01)
(Continued)

(52) U.S. Cl.
CPC ............... *B65F 3/04* (2013.01); *B60H 1/24* (2013.01); *B60K 35/00* (2013.01); *B60N 2/0021* (2023.08);
(Continued)

(58) Field of Classification Search
CPC ............... B65F 3/04; B65F 2003/0266; B65F 2003/0269; B65F 2003/0279;
(Continued)

(56) References Cited

U.S. PATENT DOCUMENTS 3,233,765 A * 2/1966 Barnes ..................... B65F 3/00
180/327
3,493,078 A * 2/1970 Colley .................... B66F 9/127
187/222
(Continued)

FOREIGN PATENT DOCUMENTS

CN       101530265 A *  9/2009  ............. A47C 7/744
CN       201431641 Y *  3/2010
(Continued)

OTHER PUBLICATIONS

DE 202016101747 U1 English translation (Year: 2016).*
(Continued)

*Primary Examiner* — Angelina M Shudy
(74) *Attorney, Agent, or Firm* — Foley & Lardner LLP

(57) ABSTRACT

A refuse truck includes a chassis, a body, a lift assembly coupled to the chassis and/or the body, a cab coupled to the chassis and positioned in front of the body, and a control system. The cab includes an armrest comprising controls pivotable between an active position and an inactive position and an armrest position sensor configured to determine a position of the armrest between the active position and the inactive position. The control system configured to control a user interface to provide an indication of a current position of the lift assembly. The control system further configured to determine a position of the armrest, and selectively activate a pendent control on an exterior of the body.

17 Claims, 6 Drawing Sheets

(51) Int. Cl.
  *B60K 35/00* (2006.01)
  *B60N 2/00* (2006.01)
  *B60N 2/75* (2018.01)
  *B60P 1/50* (2006.01)
  *B62D 33/06* (2006.01)
  *B66F 9/075* (2006.01)
  *B60K 35/22* (2024.01)
  *B65F 3/02* (2006.01)

(52) U.S. Cl.
  CPC ........... *B60N 2/0025* (2023.08); *B60N 2/003* (2023.08); *B60N 2/753* (2018.02); *B60P 1/50* (2013.01); *B62D 33/06* (2013.01); *B66F 9/0759* (2013.01); *B60K 35/22* (2024.01); *B65F 2003/0266* (2013.01); *B65F 2003/0269* (2013.01); *B65F 2003/0279* (2013.01)

(58) Field of Classification Search
  CPC ..... B65F 2003/025; B60H 1/24; B60K 35/00; B60K 35/22; B60K 2360/21; B60K 35/10; B60K 35/211; B60K 35/60; B60K 35/80; B60K 35/81; B60N 2/753; B60N 2/002; B60N 2/24; B60N 2/79; B60N 2/797; B60N 2/0021; B60N 2/0025; B60P 1/50; B62D 33/06; B66F 9/0759; B60Y 2200/144; B66C 1/42; B66C 13/46; B66C 13/54; B60W 2/003
  See application file for complete search history.

(56) References Cited

U.S. PATENT DOCUMENTS

| | | | | |
|---|---|---|---|---|
| 4,948,325 | A * | 8/1990 | Hodgetts | B65G 35/04 414/467 |
| 5,007,786 | A * | 4/1991 | Bingman | B65F 3/001 414/409 |
| 5,592,029 | A * | 1/1997 | Hollstein | B60K 25/00 180/53.6 |
| 6,186,260 | B1 * | 2/2001 | Schenck | B60K 25/00 180/273 |
| 6,272,825 | B1 * | 8/2001 | Anderson | A01F 15/085 100/88 |
| 6,530,199 | B1 * | 3/2003 | Covington | A01D 46/084 100/177 |
| 7,290,635 | B2 * | 11/2007 | Bisick | B60N 2/797 180/326 |
| 7,831,352 | B2 * | 11/2010 | Laumer | B65F 3/06 700/285 |
| 8,865,065 | B2 * | 10/2014 | Kain | A61L 2/24 422/1 |
| 10,040,482 | B1 * | 8/2018 | Jung | G05D 1/0011 |
| 10,893,990 | B1 * | 1/2021 | Uda | B60H 3/0085 |
| 11,020,499 | B2 * | 6/2021 | Dunham | B60R 15/00 |
| 11,155,166 | B2 * | 10/2021 | Cobo | E02F 9/2083 |
| 12,162,679 | B2 * | 12/2024 | Koga | B65F 3/20 |
| 2005/0234622 | A1 * | 10/2005 | Pillar | B65F 3/043 701/41 |
| 2006/0000656 | A1 * | 1/2006 | Bisick | B60N 2/797 180/272 |
| 2006/0061122 | A1 * | 3/2006 | Billger | B66F 9/0759 296/65.07 |
| 2006/0061178 | A1 * | 3/2006 | Billger | B60N 2/797 297/344.21 |
| 2008/0083141 | A1 * | 4/2008 | Treuthardt | G05G 1/02 701/50 |
| 2008/0228323 | A1 * | 9/2008 | Laumer | B65F 3/06 700/285 |
| 2009/0013661 | A1 * | 1/2009 | Link | A01D 46/085 56/480 |
| 2014/0110168 | A1 * | 4/2014 | Pursimo | E21B 7/025 701/50 |
| 2014/0343801 | A1 * | 11/2014 | Whitfield, Jr. | B65F 3/041 701/49 |
| 2015/0142279 | A1 * | 5/2015 | Goedken | B65F 3/04 701/50 |
| 2016/0207708 | A1 * | 7/2016 | Schell | B65F 3/043 |
| 2016/0368593 | A1 * | 12/2016 | Miller | B64D 11/0689 |
| 2017/0121108 | A1 | 5/2017 | Davis et al. | |
| 2017/0341860 | A1 * | 11/2017 | Dodds | B60P 1/50 |
| 2018/0044109 | A1 * | 2/2018 | Butcher | B65F 3/041 |
| 2018/0247470 | A1 * | 8/2018 | Yui | B60K 35/00 |
| 2018/0265289 | A1 | 9/2018 | Davis et al. | |
| 2018/0319642 | A1 * | 11/2018 | Pronger | G06V 20/58 |
| 2019/0019167 | A1 * | 1/2019 | Candel | B65F 3/14 |
| 2019/0076558 | A1 * | 3/2019 | Zhang-Miske | B60Q 3/12 |
| 2019/0091890 | A1 | 3/2019 | Rocholl et al. | |
| 2019/0121353 | A1 * | 4/2019 | Datema | B28C 7/022 |
| 2019/0134656 | A1 * | 5/2019 | Brooks | B05B 15/656 |
| 2019/0175971 | A1 * | 6/2019 | Moore | A61L 2/202 |
| 2019/0193934 | A1 | 6/2019 | Rocholl et al. | |
| 2019/0218032 | A1 * | 7/2019 | Whitfield, Jr. | B65F 3/041 |
| 2019/0224516 | A1 * | 7/2019 | Moore | C01B 13/10 |
| 2019/0315611 | A1 * | 10/2019 | Calomino | B66F 9/07559 |
| 2019/0322321 | A1 | 10/2019 | Schwartz et al. | |
| 2019/0325220 | A1 * | 10/2019 | Wildgrube | G06V 20/58 |
| 2019/0360600 | A1 | 11/2019 | Jax et al. | |
| 2020/0094785 | A1 * | 1/2020 | Romano | G06N 20/00 |
| 2020/0109954 | A1 * | 4/2020 | Li | G01C 21/3852 |
| 2020/0191580 | A1 * | 6/2020 | Christensen | G01C 21/343 |
| 2020/0240109 | A1 * | 7/2020 | Wallgren | E02F 9/2004 |
| 2020/0247609 | A1 * | 8/2020 | Maroney | B65F 3/04 |
| 2020/0262366 | A1 | 8/2020 | Wildgrube et al. | |
| 2020/0339346 | A1 * | 10/2020 | Maroney | B25J 5/06 |
| 2020/0346547 | A1 | 11/2020 | Rocholl et al. | |
| 2020/0346556 | A1 | 11/2020 | Rocholl et al. | |
| 2020/0346557 | A1 | 11/2020 | Rocholl et al. | |
| 2020/0346657 | A1 | 11/2020 | Clifton et al. | |
| 2020/0346854 | A1 | 11/2020 | Rocholl et al. | |
| 2020/0346855 | A1 | 11/2020 | Rocholl et al. | |
| 2020/0346856 | A1 | 11/2020 | Rocholl et al. | |
| 2020/0346857 | A1 | 11/2020 | Rocholl et al. | |
| 2020/0346858 | A1 | 11/2020 | Buege et al. | |
| 2020/0346859 | A1 | 11/2020 | Buege et al. | |
| 2020/0346860 | A1 | 11/2020 | Buege et al. | |
| 2020/0346861 | A1 | 11/2020 | Rocholl et al. | |
| 2020/0346862 | A1 | 11/2020 | Rocholl et al. | |
| 2020/0347659 | A1 | 11/2020 | Rocholl et al. | |
| 2020/0347661 | A1 | 11/2020 | Rocholl et al. | |
| 2020/0347857 | A1 | 11/2020 | Clifton et al. | |
| 2020/0348681 | A1 | 11/2020 | Clifton et al. | |
| 2020/0348764 | A1 | 11/2020 | Clifton et al. | |
| 2020/0398670 | A1 | 12/2020 | Rocholl et al. | |
| 2020/0398695 | A1 | 12/2020 | Rocholl et al. | |
| 2020/0398697 | A1 | 12/2020 | Rocholl et al. | |
| 2020/0398772 | A1 | 12/2020 | Wildgrube et al. | |
| 2020/0398857 | A1 | 12/2020 | Clifton et al. | |
| 2020/0399057 | A1 | 12/2020 | Rocholl et al. | |
| 2020/0399058 | A1 | 12/2020 | Rocholl et al. | |
| 2021/0031611 | A1 | 2/2021 | Yakes et al. | |
| 2021/0031612 | A1 | 2/2021 | Yakes et al. | |
| 2021/0054942 | A1 | 2/2021 | Jax et al. | |
| 2021/0060191 | A1 * | 3/2021 | Dunham | A61L 2/10 |
| 2021/0069934 | A1 | 3/2021 | Rocholl et al. | |
| 2021/0094417 | A1 * | 4/2021 | Cobo | E02F 9/2083 |
| 2021/0131075 | A1 * | 5/2021 | Kumakura | E02F 9/264 |
| 2021/0139303 | A1 | 5/2021 | Rosencrance et al. | |
| 2021/0221216 | A1 | 7/2021 | Yakes et al. | |
| 2021/0229755 | A1 | 7/2021 | Schwartz et al. | |
| 2021/0229908 | A1 | 7/2021 | Rocholl et al. | |
| 2021/0252995 | A1 | 8/2021 | Rocholl et al. | |
| 2021/0270008 | A1 * | 9/2021 | Loisy | E02F 3/3622 |
| 2021/0316740 | A1 | 10/2021 | Clifton et al. | |
| 2021/0316741 | A1 | 10/2021 | Clifton et al. | |
| 2021/0323436 | A1 | 10/2021 | Rocholl et al. | |
| 2021/0323437 | A1 | 10/2021 | Rocholl et al. | |
| 2021/0323438 | A1 | 10/2021 | Rocholl et al. | |
| 2021/0323763 | A1 | 10/2021 | Koga et al. | |
| 2021/0323764 | A1 | 10/2021 | Koga et al. | |
| 2021/0323765 | A1 | 10/2021 | Koga et al. | |
| 2021/0324880 | A1 | 10/2021 | Wente et al. | |

(56) References Cited

U.S. PATENT DOCUMENTS

| | | |
|---|---|---|
| 2021/0325529 A1 | 10/2021 | Koga et al. |
| 2021/0325911 A1 | 10/2021 | Koga et al. |
| 2021/0326550 A1 | 10/2021 | Kappers et al. |
| 2021/0327164 A1 | 10/2021 | Koga et al. |
| 2021/0327170 A1 | 10/2021 | Rocholl et al. |
| 2021/0327237 A1 | 10/2021 | Rocholl et al. |
| 2021/0331635 A1 | 10/2021 | Wildgrube et al. |
| 2021/0331636 A1 | 10/2021 | Wildgrube et al. |
| 2021/0331637 A1 | 10/2021 | Wildgrube et al. |
| 2021/0339632 A1 | 11/2021 | Rocholl et al. |
| 2021/0339648 A1 | 11/2021 | Koga et al. |
| 2021/0339949 A1 | 11/2021 | Rocholl et al. |
| 2021/0345062 A1 | 11/2021 | Koga et al. |
| 2021/0373560 A1 | 12/2021 | Koga et al. |
| 2021/0396251 A1 | 12/2021 | Clifton et al. |
| 2022/0009338 A1 | 1/2022 | Yakes et al. |
| 2022/0010531 A1* | 1/2022 | Rossi ................... B66F 9/20 |
| 2022/0033181 A1 | 2/2022 | Koga et al. |
| 2022/0096884 A1 | 3/2022 | Koga et al. |
| 2022/0097527 A1 | 3/2022 | Koga et al. |
| 2022/0097555 A1 | 3/2022 | Koga et al. |
| 2022/0097556 A1 | 3/2022 | Koga et al. |
| 2022/0097633 A1 | 3/2022 | Koga et al. |
| 2022/0097961 A1 | 3/2022 | Koga et al. |
| 2022/0097962 A1 | 3/2022 | Koga et al. |
| 2022/0097963 A1 | 3/2022 | Koga et al. |
| 2022/0097964 A1 | 3/2022 | Koga et al. |
| 2022/0099723 A1 | 3/2022 | Koga et al. |
| 2022/0105827 A1 | 4/2022 | Rocholl et al. |
| 2022/0106114 A1 | 4/2022 | Buege et al. |
| 2022/0106115 A1 | 4/2022 | Buege et al. |
| 2022/0118854 A1 | 4/2022 | Davis et al. |
| 2022/0156474 A1 | 5/2022 | Kappers et al. |
| 2022/0161854 A1 | 5/2022 | Mortenson et al. |
| 2022/0161997 A1 | 5/2022 | Mortenson et al. |
| 2022/0185582 A1 | 6/2022 | Koga et al. |
| 2022/0219896 A1 | 7/2022 | Gary et al. |
| 2022/0258965 A1 | 8/2022 | Kappers et al. |
| 2022/0258967 A1* | 8/2022 | Kappers ................. B65F 3/041 |
| 2022/0289108 A1* | 9/2022 | Burbank .................. B60R 1/25 |
| 2022/0332230 A1* | 10/2022 | Goemer ............... B60N 2/0033 |
| 2022/0340397 A1* | 10/2022 | Woidneck .......... G05G 9/04788 |
| 2022/0342415 A1* | 10/2022 | Suzuki ................. B60W 40/08 |
| 2023/0089417 A1 | 3/2023 | Koga et al. |
| 2023/0123551 A1* | 4/2023 | Luke ...................... A61L 2/088 |
| | | 422/24 |
| 2023/0201397 A1* | 6/2023 | Roberge ............ G07C 9/00174 |
| 2023/0249624 A1* | 8/2023 | Bastiyali ................ B60R 11/02 |
| | | 296/37.8 |
| 2023/0415986 A1* | 12/2023 | Steffens .................. B65F 3/201 |

FOREIGN PATENT DOCUMENTS

| | | | | |
|---|---|---|---|---|
| CN | 213035630 U | * | 4/2021 | |
| DE | 202016101747 U1 | * | 6/2016 | |
| ES | 2635018 T3 | * | 10/2017 | ............ B60K 13/04 |
| FR | 3124121 A1 | * | 12/2022 | |
| TW | M605572 U | * | 12/2020 | |

OTHER PUBLICATIONS

TWM605572U machine translation (Year: 2020).*
CN-213035630-U machine translation (Year: 2021).*
CN-201431641-Y machine translation (Year: 2010).*
ES-2635018-T3 machine translation (Year: 2017).*
FR-3124121-A1 machine translation (Year: 2022).*
CN-101530265-A machine translation (Year: 2009).*
Heil Environmental, Freightliner Facebook video, https://www.facebook.com/HeilEnvironmental/videos/vb.248460091865486/147746396776905/?type=2&theater, posted Dec. 14, 2020, accessed Feb. 25, 2021.

* cited by examiner

LARGE CAB INNOVATIONS

CROSS-REFERENCE TO RELATED PATENT APPLICATION

This application claims the benefit of U.S. Provisional Patent Application No. 63/150,375, filed Feb. 17, 2021, which is incorporated herein by reference in its entirety.

BACKGROUND

Refuse trucks collect a wide variety of waste, trash, and other material from residences and businesses. Operators of the refuse truck transport the material from various waste receptacles within a municipality to a storage or processing facility (e.g., a landfill, an incineration facility, a recycling facility, etc.).

SUMMARY

One embodiment relates to a refuse truck. The refuse truck includes a chassis, a body coupled to the chassis, a lift assembly coupled to at least one of the chassis or the body, a cab coupled to the chassis and positioned in front of the body, and a control system. The cab comprising an armrest comprising controls pivotable between an active position and an inactive position. The cab further comprising an armrest position sensor configured to determine a position of the armrest between the active position and the inactive position. The control system configured to control a user interface to provide an indication of a current position of the lift assembly. The control system further configured to determine a position of the armrest and selectively activate a pendent control on an exterior of the body.

Another embodiment relates to a vehicle. The vehicle includes a chassis, a body assembly, and a cab. The body assembly is coupled to the chassis and defines a front portion and a rear portion. The cab is coupled to the chassis proximate the front portion of the body assembly. The cab includes an armrest, an armrest position sensor, and a pendent control. The armrest is pivotable between an active position and an inactive position and includes controls. The armrest position sensor is configured to determine a position of the armrest between the active position and the inactive position. The pendent control is positioned on an outer wall of the body assembly, proximate the rear portion. The pendent control is activated when the armrest is determined to be in the inactive position and the pendent control is deactivated when the armrest is determined to be in the active position.

Another embodiment relates to a cab for a vehicle. The cab includes an ozone cabinet, an armrest, an armrest position sensor, a pendent control, and a plurality of cameras. The ozone cabinet is configured to facilitate decontaminating of at least one of an area of the cab and an equipment positioned within the cab. The armrest is pivotable between an active position and an inactive position and includes controls. The armrest position sensor is configured to determine a position of the armrest between the active position and the inactive position. The pendent control is positioned on an outer wall of the vehicle. The plurality of cameras are mounted on an exterior of the cab and configured to determine a status of the vehicle. The plurality of cameras include a first camera and a second camera. The first camera is mounted between a vehicle body and the cab and configured to monitor a refuse accumulation in a collection compartment. The second camera is mounted on a passenger side of the cab and configured to monitor a position of a lift assembly.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a refuse truck (e.g., a front end loading refuse truck, a side loading refuse truck, a refuse truck, etc.) includes a lift arm assembly also referred to as a lifting system (e.g., an extendable lift arm assembly, a telescoping lift arm assembly, etc.) and a control system. The lift arm assembly is repositionable between a plurality of positions including a stowed position, a working position, and a transit position. The control system is configured to monitor the surroundings of the refuse truck, current position of the lift arm assembly, and/or the speed of the vehicle. In some embodiments, the control system is configured to control a user interface (e.g., a display, a series of lights, etc.) of the refuse truck to provide an indication of a current position of the lift arm assembly. In some embodiments, the control system is configured to determine a location of a user. In some embodiments, the control system is configured to enable or disable particular controls depending on a user input and/or a determined location of the user.

Figure 1:
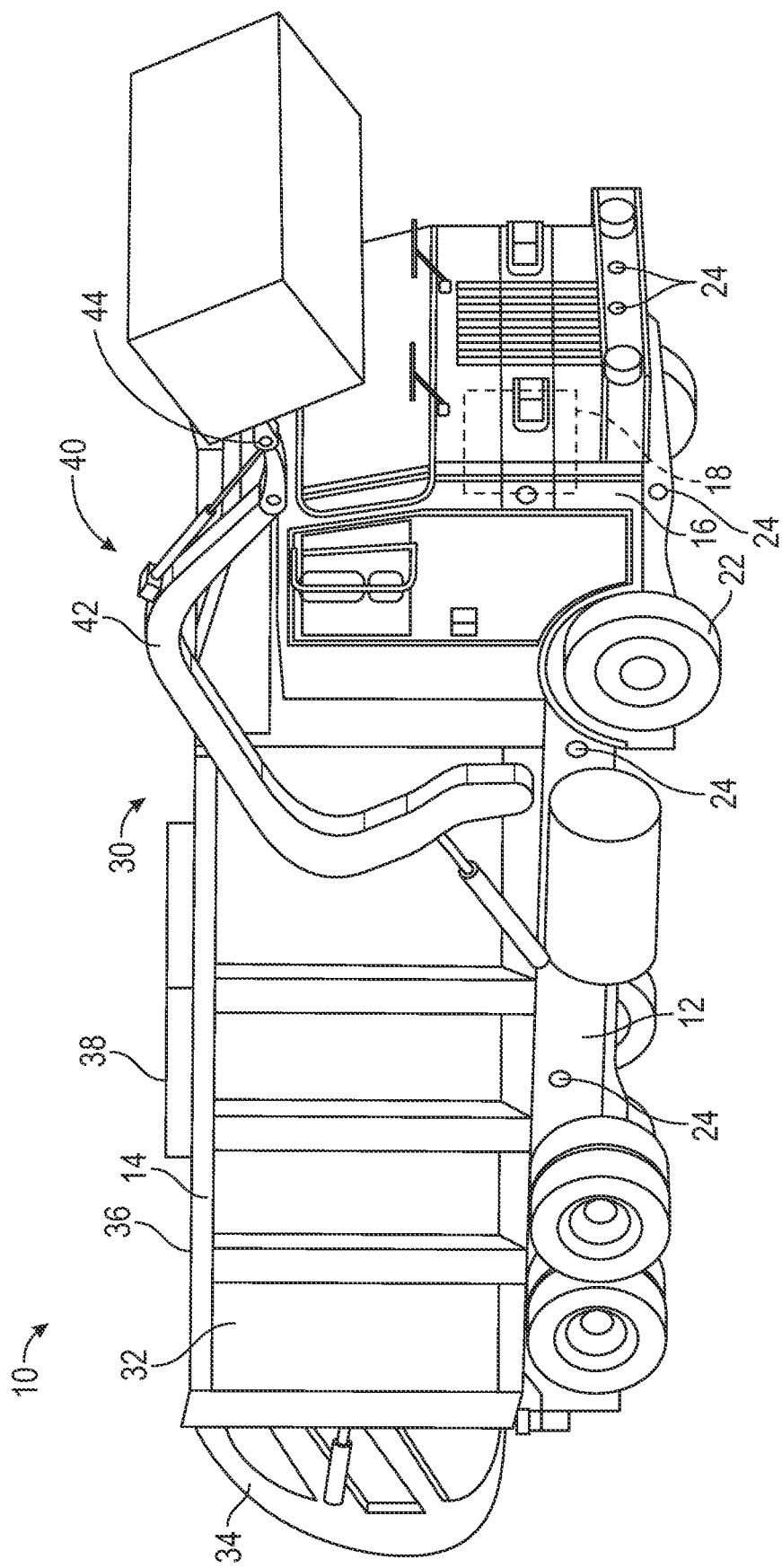
FIG. 1 is a perspective view of a front loading refuse truck according to an exemplary embodiment.
Figure 2:
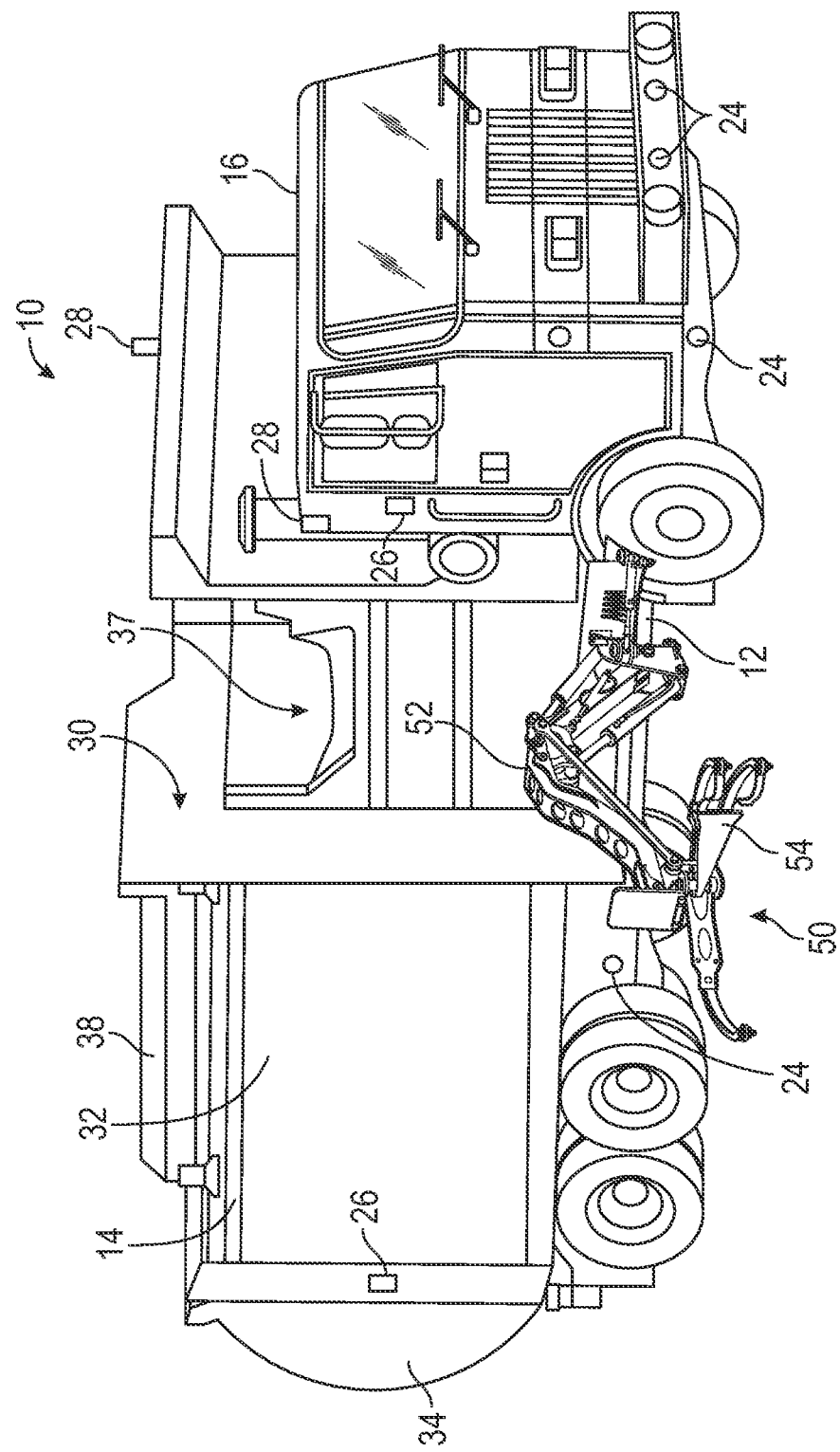
FIG. 2 is a perspective view of a side loading refuse truck according to an exemplary embodiment.

Referring to FIGS. 1-2, a vehicle, shown as refuse truck 10 (e.g., garbage truck, waste collection truck, sanitation truck, etc.), includes a chassis, shown as a frame 12, and a body assembly, shown as body 14, coupled to the frame 12. The body assembly 14 defines an on-board receptacle 30, also referred to as collection chamber 30, and a cab 16. The cab 16 is coupled to a front end of the frame 12, and includes various components to facilitate operation of the refuse truck 10 by an operator (e.g., a seat, a steering wheel, hydraulic controls, etc.) as well as components that can execute commands automatically to control different subsystems within the vehicle (e.g., computers, controllers, processing units, etc.) as described herein. The refuse truck 10 further includes a prime mover 18 also referred to as engine 18 coupled to the frame 12 at a position beneath the cab 16. The prime mover 18 provides power to a plurality of motive members, shown as wheels 22, and to other systems of the vehicle (e.g., a pneumatic system, a hydraulic system, etc.). The prime mover 18 may be configured to use a variety of fuels (e.g., gasoline, diesel, bio-diesel, ethanol, natural gas, etc.), according to various exemplary embodiments. According to an alternative embodiment, the prime mover 18 is one or more electric motors coupled to the frame 12. The electric motors may consume electrical power from an on-board storage device (e.g., batteries, ultra-capacitors, etc.), from an on-board generator (e.g., an internal combustion engine), or from an external power source (e.g., overhead power lines) and provide power to the systems of the refuse truck 10.

According to an exemplary embodiment, the refuse truck 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse collection container 30. Loose refuse may be placed into the refuse collection container 30 where it may thereafter be compacted. The refuse collection container 30 may provide temporary storage for refuse during transport to a waste disposal site and/or a recycling facility. In some embodiments, at least a portion of the body 14 and the refuse collection container 30 extend in front of and/or above the cab 16. According to the embodiment shown in FIG. 1, the body 14 and the refuse collection container 30 are positioned behind the cab 16. In some embodiments, the refuse collection container 30 includes a hopper volume and a storage volume. Refuse may be initially loaded into the hopper volume and thereafter compacted into the storage volume. According to an exemplary embodiment, the hopper volume is positioned between the storage volume and the cab 16 (i.e., refuse is loaded into a position of the refuse collection container 30 behind the cab 16 and stored in a position further toward the rear of the refuse collection container 30). In other embodiments, the storage volume is positioned between the hopper volume and the cab 16 (e.g., a rear-loading refuse truck, etc.). The cab 16 can be a large cab 16 allowing for more space for the operator or operators within the cab 16. The large cab can beneficially provide space for the driver to egress through the cab 16 and provide additional space for storage and other devices (e.g., ozone cabinet 402). The large cab 16 may be shorter in height and longer than a cab utilized in traditional refuse trucks.

Referring again to the exemplary embodiment shown in FIG. 1, the refuse truck 10 is a front-loading refuse truck. As shown in FIG. 1, the refuse truck 10 includes a lift assembly, shown as lifting system 40, that includes a pair of arms 422 coupled to the frame 12 on either side of the cab 16. The arms 42 may be rotatably coupled to the frame 12 with a pivot (e.g., a lug, a shaft, etc.). In some embodiments, actuators (e.g., hydraulic cylinders, etc.) are coupled to the frame 12 and the arms 42, and extension of the actuators rotates the arms 42 about an axis extending through the pivot. According to an exemplary embodiment, interface members, shown as forks 44, are coupled to the arms 42. The forks 44 have a generally rectangular cross-sectional shape and are configured to engage a refuse container (e.g., protrude through apertures within the refuse container, etc.). During operation of the refuse truck 10, the forks 44 are positioned to engage the refuse container (e.g., the refuse truck 10 is driven into position until the forks 44 protrude through the apertures within the refuse container). As shown in FIG. 1, the arms 42 are rotated to lift the refuse container over the cab 16. A second actuator (e.g., a hydraulic cylinder) articulates the forks 44 to tip the refuse out of the container and into the hopper volume of the collection container 30 through an opening in the cover 36. The actuator thereafter rotates the arms 42 to return the empty refuse container to the ground. According to an exemplary embodiment, a top door 38 is slid along the cover 36 to seal the opening thereby preventing refuse from escaping the collection container 30 (e.g., due to wind, etc.). In some embodiments, collision avoidance sensors 24 are located on the frame 12 and or body 14 of the refuse truck 10. The collision avoidance sensors 24 can be located on the front, back, sides, and/or top of the refuse truck 10. The collision avoidance sensors 24 can be any suitable proximity and/or motion sensors (e.g., infrared (IR) sensors, ultrasonic sensors, inductive sensors, magnetic sensors). The refuse truck 10 may further include a number of cameras and controls on the exterior of the refuse truck 10, as described herein.

Referring to the exemplary embodiment shown in FIG. 2, the refuse truck 10 is a side-loading refuse truck that includes a lifting system 50, shown as a grabber 54 that is configured to interface with (e.g., engage, wrap around, etc.) a refuse container (e.g., a residential garbage can, etc.). According to the exemplary embodiment shown in FIG. 2, the grabber 54 is movably coupled to the frame 12 with an arm 52. In some embodiments, the grabber is movably coupled to the body 14. The arm 52 includes a first end coupled to the frame 12 and a second end coupled to the grabber 54. An actuator (e.g., a hydraulic cylinder) articulates the arm 52 and positions the grabber 54 to interface with the refuse container. The arm 52 may be movable within one or more directions (e.g., up and down, left and right, in and out, rotation, etc.) to facilitate positioning the grabber 54 to interface with the refuse container. According to an alternative embodiment, the grabber 54 is movably coupled to the frame 12 with a track. After interfacing with the refuse container, the grabber 54 is lifted up the track (e.g., with a cable, with a hydraulic cylinder, with a rotational actuator, etc.). The track may include a curved portion at an upper portion of the body 14 so that the grabber 54 and the refuse container are tipped toward the hopper volume of the collection container 30. In either embodiment, the grabber 54 and the refuse container are tipped toward the hopper volume of the collection container 30 (e.g., with an actuator, etc.). As the grabber 54 is tipped, refuse falls through an opening in the cover 36 and into the hopper volume of the collection container 30. The arm 52 or the track then returns the empty refuse container to the ground, and the top door 38 may be slid along the cover 36 to seal the opening thereby preventing refuse from escaping the collection container 30 (e.g., due to wind).

Referring again to FIG. 2, in some embodiments, collision avoidance sensors 24 are located on the frame 12 and/or body 14 of the refuse truck 10. The collision avoidance sensors 24 can be located on the front, back, sides, and/or top of the refuse truck 10. The collision avoidance sensors 24 can be any suitable proximity and/or motion sensors (e.g., infrared (IR) sensors, ultrasonic sensors, inductive sensors, magnetic sensors). In some embodiments, cameras 28 are mounted on the body 14 and/or cab 16 of the refuse truck 10. The cameras 28 can be any suitable device for capturing images and/or video (e.g., high resolution camera, thermal camera, infrared camera). For example, a first camera can be mounted on the body 14, the cab 16, or between the body 14 and the cab 16 to provide a view of the collection container 30. The view of the collection container 30 may be beneficial as it allows the user to view the accumulation of refuse. Another example location for a camera 28 is on an upper rear corner of the cab 16 as shown in FIG. 2. The camera 28 can be utilized to monitor the lifting system 50. In some embodiments, cameras 28 may be arranged surrounding the refuse truck 10 (e.g., front, sides, and back) to capture the complete surroundings of the refuse truck 10. These are particular configurations, and there are many other locations where a camera can be used on an exterior of a refuse truck 10.

Still referring to FIG. 2, the refuse truck 10 can include pendent control(s) 26. The pendent control(s) 26 can be used to control the functioning of the moving components of the refuse truck 10 (e.g., lifting system 40, lifting system 50, tailgate 34). In some embodiments, the pendent control 26 may be fixed to and/or built into the body 14 and/or cab 16. In some embodiments, the pendent control 26 may be removably attached to the body 14 and/or cab 16 such that the pendent control 26 communicates with a controller via a wireless signal or connection (e.g., Bluetooth, network connection, radio frequency (RF)). In some embodiments, the pendent control 26 may be attached to the body 14 and/or cab 16 by a retractable or non-retractable cable to transmit a signal to the controller from the pendent control 26. For example, a pendent control 26 can be mounted on a side of the body 14 near the rear of the refuse truck 10 and/or mounted on the side of the cab 16. These are example configurations and there are many possible configurations and locations of the pendent control(s) 26.

Figure 3:
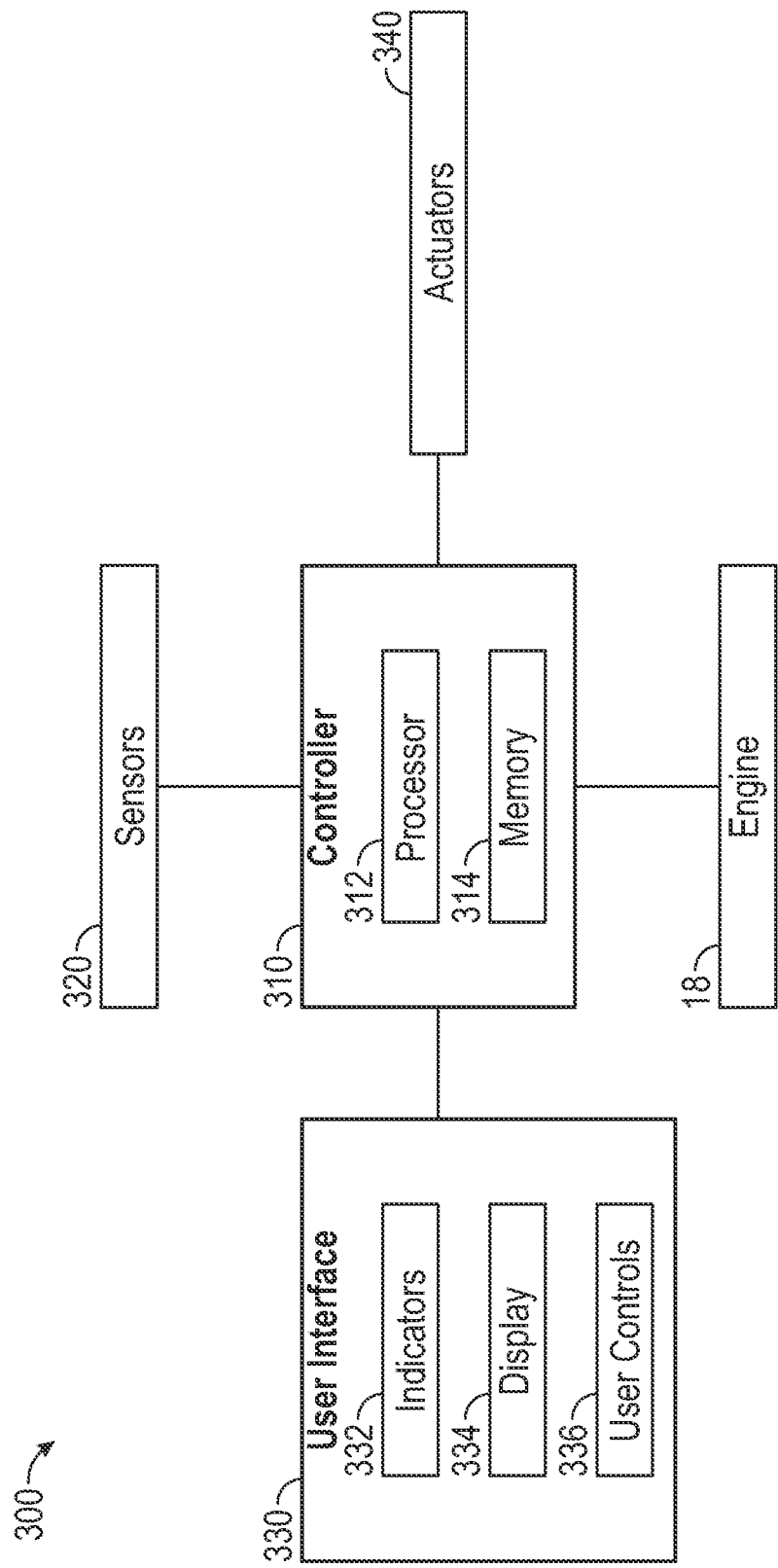
FIG. 3 is a schematic diagram of a control system of the refuse truck of FIG. 1 or FIG. 2, according to an exemplary embodiment.

Referring next to FIG. 3, among others, a schematic diagram of a control system 300 of the refuse truck 10 is shown, according to an example embodiment. The control system 300 includes a controller 310, sensors 320, user interface 330, actuators 340, and the engine 18. In one embodiment, the controller 310 is configured to selectively engage, selectively disengage, control, or otherwise communicate with components of the refuse truck 10. As shown in FIG. 3, the controller 310 is coupled to (e.g., communicably coupled to) components of the refuse truck 10 including the engine 18, the actuators to control the lifting system 40, the actuators to control the lifting system 50, among other actuators of the refuse truck 10. The controller may be coupled to one or more sensors (e.g., collision avoidance sensors 24, driver's seat sensors, armrest sensors, weight sensors), and a user input/output device, shown as user interface 330. By way of example, the controller 310 may send and receive signals (e.g., control signals) with the engine 18, the actuators 340, the sensors 320, and/or the user interface 330.

The controller 310 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 3, the controller 310 includes a processing circuit 312 and a memory 314. The processing circuit 312 may include an ASIC, one or more FPGAs, a DSP, circuits containing one or more processing components, circuitry for supporting a microprocessor, a group of processing components, or other suitable electronic processing components. In some embodiments, the processing circuit 312 is configured to execute computer code stored in the memory 314 to facilitate the activities described herein. The memory 314 may be any volatile or non-volatile computer-readable storage medium capable of storing data or computer code relating to the activities described herein. According to an exemplary embodiment, the memory 314 includes computer code modules (e.g., executable code, object code, source code, script code, machine code, etc.) configured for execution by the processing circuit 312. In some embodiments, the controller 310 may represent a collection of processing devices (e.g., servers, data centers, etc.). In such cases, the processing circuit 312 represents the collective processors of the devices, and the memory 314 represents the collective storage devices of the devices.

The sensors 320 can include lift position sensors. In some embodiments, the lift position sensors determine a position of lifting system 40 or lifting system 50. A lift position sensor may be any suitable sensor able to determine a position or extension of the one or more lifting system (e.g., rotary sensor, proximity sensor). In some embodiments the controller 310 may determine a location of the one or more lifting systems based on the one or more control signals transmitted to the actuators 340 of the lifting system.

The sensors 320 can include collision avoidance sensors 24. The collision avoidance sensors 24 can be located on the front, back, and/or sides of the refuse truck 10. The collision avoidance sensors 24 can be any suitable proximity and/or motion sensors (e.g., infrared (IR) sensors, ultrasonic sensors, inductive sensors, magnetic sensors). In some embodiments, based on a determined location of the one or more lifting systems, the collision avoidance sensors can be selectively deactivated. For example if the lifting system 50 is determined to be extended, based on lift position sensor data and/or logged actuator control signals, the collision avoidance sensors 24 on the side of the refuse truck 10 with the lifting system 50 may be deactivated. In another example, if the lifting system 40 is determined to be in a working position (e.g., extended in front of the cab 16) the collision avoidance sensor 24 on the front of the refuse truck 10 may be deactivated. This may be beneficial, as deactivating collision avoidance sensors 24 in the proximate location of the extended lifting systems would reduce false collision signals presented to the controller 310 and/or the driver.

The sensors 320 can include cab sensors. The cab sensors can include a driver's seat sensor, an arm rest position sensor, and/or floor weight sensors. The cab sensors can be used to determine a position of the driver of the refuse truck 10. A driver's seat sensor can include any sensor suitable for determining a user has sat in the driver's seat. For example, the driver's seat sensor can be one or more pressure sensors, strain gages, seatbelt sensors, etc. The floor weight sensors can include any sensor suitable for determining a position of a driver in the driver's area (e.g., driver's seat, floor in front of driver's seat). The floor weight sensor can include pressure sensors, strain gages, etc. To limit false determinations of changed positions of the operator, also referred to as driver, due to minor operator movements, bumps in the road, etc. the controller 310 can utilize a deadband range to disregard readings between a calibrated zero indicating no driver present and a signal indicating the presence of a driver. In some embodiments, the controller 310 can provide a delay in the collected sensor data and/or create a rolling average of the collected data to limit false determination of driver presence.

An armrest position sensor can be used to determine a position of the armrest 602. In some embodiments, the armrest 602 can be pivotably mounted to the driver's seat allowing the armrest 602 to pivot from an active position (e.g., horizontal) to an inactive position (e.g., vertical). In some embodiments, the armrest 602 can be pivotably mounted to a dashboard in the cab 16 allowing the armrest to pivot from an active position (e.g., horizontal) to an inactive position (e.g., vertical). In some embodiments, the armrest 602 can be mounted to the dashboard in the cab 16 and be configured to pivot about a vertical axis from an active position in reach of the driver from the driver's seat to an inactive position in line with the dashboard. The armrest position sensor can be any suitable sensor to determine the position of the armrest 206. The armrest position sensor can include a rotary sensor (e.g., to determine an angle of the armrest 206), an infrared position sensor, a button or switch engaged when in a particular position (e.g., active, inactive). To limit false determinations of changed positions between active and inactive due to minor operator movements, bumps in the road, etc. the controller 310 can utilize a deadband range to disregard readings between an active range (e.g., 0°-15°) and an inactive range (e.g., 75°-90°). In some embodiments, the controller 310 can provide a delay in the collected sensor data and/or create a rolling average of the collected data to limit false determination of changed positions of the armrest 602.

In some embodiments, the sensors may include camera(s) 28. In some embodiments, the one or more cameras 28 may provide a video feed with a single view of particular area of the refuse truck 10 and/or surroundings of the refuse truck (10) (e.g., refuse accumulation in collection container 30, lifting system 50, rear surroundings of refuse truck 10). In some embodiments, the controller 310 is structured to stitch together the received video feeds from the cameras 28 (e.g., front, back, and sides) to create a video feed of an overhead view of the refuse truck 10 and its surroundings (e.g., birds-eye view).

The user interface 330 include indicators 332, display(s) 334, and/or user controls 336. In some embodiments, the indicators 332 can be used to identify proximate objects based on the signal from the collision avoidance sensors 24. In these instances, the indicator 332 can be a visual indicator (e.g., lights, lightbulbs, LEDs) and/or an auditory indicator (e.g., beep, buzz). In some embodiments, indicators 332 can be used to denote a position of the one or more lifting systems. For example, a first indicator may indicate the lifting system 40 is in a stowed position (i.e., not extended), a second indicator may indicate the lifting system 40 is in a transit position (i.e., slightly extended but out of the vision path of a driver of the refuse truck 10), and a third indicator may indicate the lifting system 40 is in a working position (i.e., extended in front of the cab 16). In other embodiments, the indicators 332 include a different number of indicators to provide increased granularity regarding additional positions of the lifting system 40 (i.e., positions between the stowed position, the working position, and the transit position). According to an exemplary embodiment, the indicators 332 are or include lighting elements (e.g., lights, light bulbs, LEDs, etc.). According to an exemplary embodiment, the controller 310 is configured to illuminate, flash, change the color of, or otherwise activate the indicators 332 to provide the visual indication of the current position of the lifting system 40 to the operator. In some embodiments, the indicators 332 function as inputs (e.g., buttons, etc.) that allow the operator to manually provide a command to the controller 310 to control the actuators of the lifting system 40 to reposition the lifting system 40 to the position associated with the selected indicator 332. By way of example, the operator may select the second indicator and the controller 310 may be configured to control the actuators of the lifting system 40 to move the lifting system 40 to the second or transit position.

The controller 310 is configured to control the display 334. The controller 310 is configured to display a singular video feed, stitched video feeds, graphical user interfaces, graphics of the refuse truck 10, etc. An example graphical user interface includes a first indicator of the current height of the refuse truck 10 including the height of the one or more lifting systems (e.g., Current Height: XX'XX"), and a second section which provides a display of the current position of the one or more lifting systems. In some embodiments, the display of the current position of the one or more lifting systems can include an animated diagram such that an operator may understand the current position of the lifting system. In some embodiments, the display of the current position can include a video feed of the particular lifting system or a stitched video feed providing an overhead view of the refuse truck 10. The position display may display the extension of the one or more lifting systems (e.g., lifting system 40, lifting system 50), an extension of the collection container 30 (e.g., ejector position), an extension of the tailgate 34, etc.

According to an exemplary embodiment, the controller 310 is configured to populate, adjust, update, etc. the current height indicator and/or the current position display based on the position data and/or camera data. In some embodiments the current position display is a three dimensional (3D) graphic display of the refuse truck 10 including the current position of all actuatable components. The current height indicator facilitates providing a visual indication of a current maximum height of lifting system to the operator. Such information may be used by the operator to manually manipulate the position of the lifting system as the refuse truck 10 approaches height restricted or low clearance areas/environment (e.g., an overpass, a roof or overhang, a garage, a packing structure, etc.). The current position display facilitates providing a visual indication of the current position of the telescoping lift arm assembly 100 (e.g., the stowed position; the working position; the transit position; positions between the stowed position, the working position, and the transit position; etc.). In some embodiments, the graphical user interface displays various selectable buttons or tiles (e.g., a stowed button/tile, a transit button/tile, a working button/tile, etc.) that allow the operator to manually provide a command to the controller 310 to control the actuators of the lifting system to reposition the lifting system to the positioned associated with the selected button or tile. By way of example, the operator may select a respective button or tile and the controller 310 may be configured to control the actuators of the lifting system to move the lifting system to the position associated therewith.

The user controls 336 can include the one or more pendent controls 26, armrest controls 604, window controls, and/or dashboard controls 502. The user controls 336 can include any number of finger switches, buttons, touch screens, toggles, joysticks, dials, etc. used to provide operator input for the actuation of the actuatable components of the refuse truck 10 (e.g., lifting system 40, lifting system 50, collection container 30, tailgate 34). In some embodiments, the armrest controls 604, window controls, and or dashboard controls 502 can be used to activate or deactivate the pendent control 26. In some embodiments, the pendent control 26 may be fixed to and/or built into the body 14 and/or cab 16. In some embodiments, the pendent control 26 may be removably attached to the body 14 and/or cab 16 such that the pendent control 26 communicates with a controller via a wireless signal or connection (e.g., Bluetooth, network connection, radio frequency (RF)). In some embodiments, the pendent control 26 may be attached to the body 14 and/or cab 16 by a retractable or non-retractable cable to transmit a signal to the controller from the pendent control 26. For example, a pendent control 26 can be mounted on a side of the body 14 near the rear of the refuse truck 10 and/or mounted on the side of the cab 16. In some embodiments, the pendent controls 26 can include a user device such as a smartphone, tablet, wearable device, etc. In these embodiments, the pendent controls 26 may be mounted to an exterior of the refuse truck 10. In some embodiments, the pendent control may be kept in the possession of the user (e.g., in a pocket, arm strap). These are example configurations and there are many possible configurations and locations of the pendent control(s) 26.

In some embodiments, the pendent controls 26 can be permanently activated, thus the pendent controls 26 can be used to control one or more of the actuatable components of the refuse truck 10 at all times. In some embodiments, the pendent controls 26 can be selectively activated based on an input on the dashboard controls 502, window controls, and or the armrest controls 604. In some embodiments, the pendent controls 26 can be selectively activated based on a determined driver location from the driver's seat sensors, weight sensors, and or armrest position sensors. For example, if the armrest position sensors indicate that the armrest is in an inactive position, the controller 310 can selectively activate the one or more pendent controls 26. This is a particular example, and many other configurations are possible for selectively activating or deactivating the pendent controls 26.

The armrest controls 604 can be used to control one or more of the actuatable components of the refuse truck. In some embodiments, the armrest controls 604 can include a control input (e.g., switch, button) signaling for the controller 310 to selectively activate the pendent controls 26 and/or deactivate the armrest controls 604. In some embodiments, the armrest controls are permanently activated. In some embodiments, the armrest controls are selectively deactivated dependent on a determined position of the armrest by the one or more armrest position sensors. In one example, when the armrest is determined to be in the active position (e.g., horizontal), the controller 310 may activate the armrest controls 604. When the armrest is determined to be in an inactive position (e.g., vertical) the controller 310 may deactivate the armrest controls 604. The control signals from the armrest controls 604 can be transmitted to the controller 310 via a wired connection and/or a wireless connection (e.g., Bluetooth, nearfield communication (NFC), radio frequency, network communication). In some embodiments, the window controls can be formed into the cab beneath a driver's side window.

In some embodiments, the controller 310 is configured to control the actuators 340 of the refuse truck 10 (e.g., lifting system 40, lifting system 50, collection container 30, tailgate 34). The controller 310 can control the actuators of the lifting systems to automatically adjust the position of the lifting systems (e.g., while the mode or condition data indicates the refuse truck 10 is in a transit mode or condition, etc.) based on the environment data and/or the position data acquired from the sensors 320 to avoid upcoming or proximate external objects. According to an exemplary embodiment, the controller 310 is configured to automatically reduce the current height of lifting system 40 to accommodate low clearance areas/environments while maintaining sufficient visibility for the operator from the cab 16 ahead of the refuse truck 10 (e.g., the controller 310 will not substantially block or obstruct the view of the operator, etc.). In some embodiments, the controller 310 is configured to provide an adjustment indication (e.g., a notification, an alert, a warning, etc.) via the user interface 330 (i) requesting that the operator approve the automatic adjustment or (ii) indicating that the operator should consider manually repositioning the lifting system 40 to avoid upcoming or proximate external objects based on the environment data and/or the position data. In some embodiments, the controller 310 is configured to prevent the operator from manually adjusting the position the lifting system 40 beyond a certain position to prevent the lifting system 40 from inadvertently engaging with an external object (e.g., in a low clearance environment, etc.).

By way of example, the controller 310 may be configured to (i) acquire the environment data from the sensors 320 (e.g., a camera, an optical sensor, a proximity sensor/detector, etc.) and/or the position data from the position sensors (the position data may not be necessary depending on whether the first environment sensor acquires data regarding proximity of the lifting systems to external objects) and (ii) control the actuators of the lifting systems based on the environment data and/or the position data to automatically reposition the lifting systems without requiring manual operator interaction or intervention such that the lifting systems do not engage with surrounding external objects (e.g., so that the current height of the lifting system 40 is under height for an upcoming overpass, bridge, entryway, garage, etc.). By way of another example, the controller 310 may be configured to (i) acquire the environment data from the sensors 320 (e.g., a GPS sensor, a telematics sensor, etc.) and the position data from the position sensors and (ii) control the actuators of the lifting systems based on the environment data and the position data to automatically reposition the lifting systems without requiring manual operator interaction or intervention such that the lifting systems do not engage with surrounding external objects.

In some embodiments, the controller 310 is configured to control the speed of the engine 18 and/or the refuse truck 10 based on the speed data and/or the position data. By way of example, the controller 310 may be configured to limit the speed or prevent the refuse truck 10 from exceeding a speed threshold in response to the position data indicating that the lifting systems are not in the transit position. By way of another example, the controller 310 may be configured to monitor the speed data and the position data, and provide a speed indication (e.g., a notification, an alert, a warning, etc.) to the operator via the user interface 330 when the speed of the refuse truck 10 reaches or as the speed of the refuse truck approaches the speed threshold. The speed indication may (i) request approval to automatically reposition the lifting systems to the transit position or (ii) indicate that the operator should consider manually repositioning the lifting systems to the transit position if the operator wishes to accelerate to an increased speed.

While the lifting systems disclosed herein is described as being an extendable or telescoping lifting systems, the functions of the control system 300 and the controller 310 described herein may similarly apply to a non-extendable or non-telescoping lift arm assembly.

Figure 4:
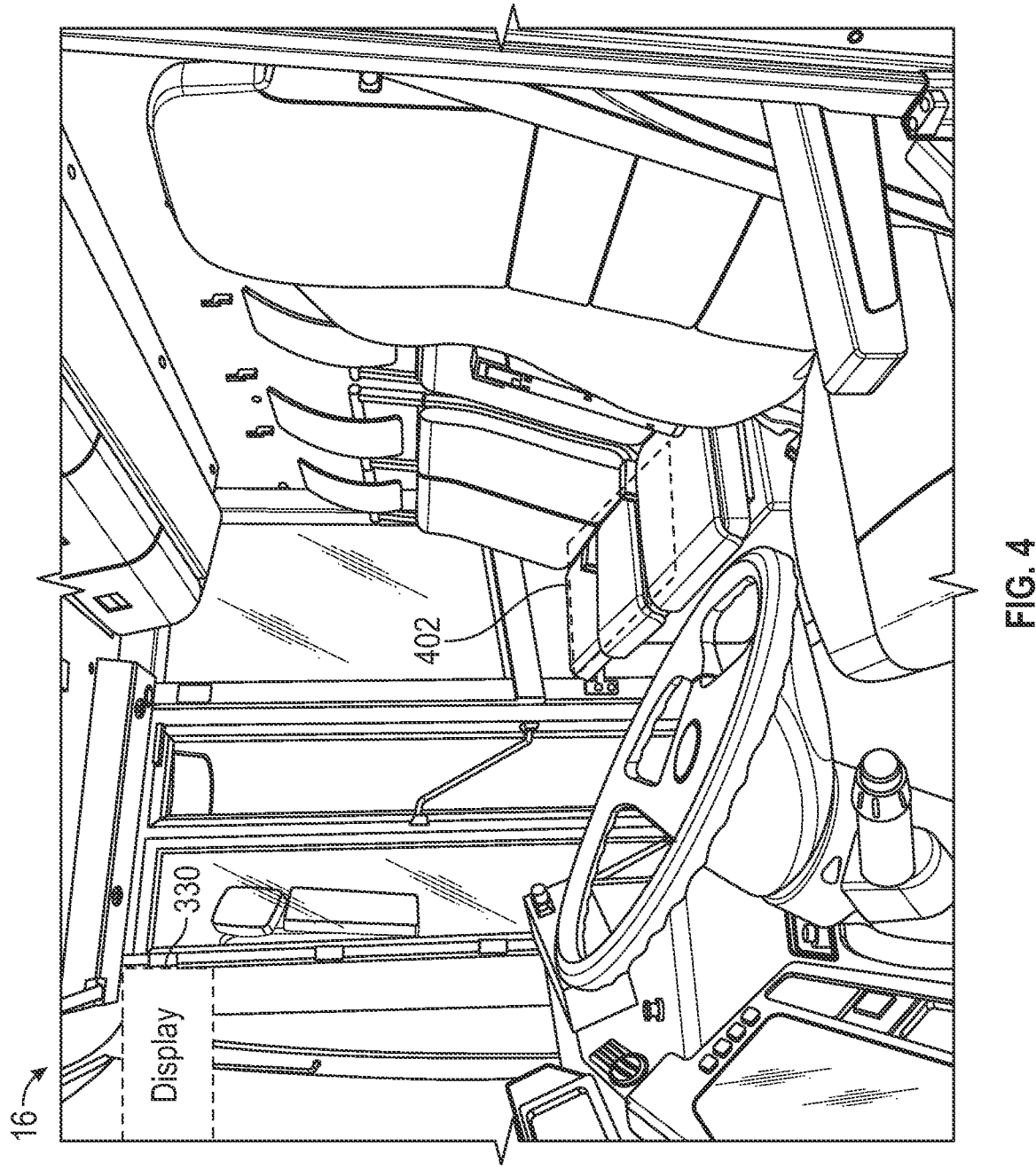
FIG. 4 is a perspective view of a cab interior of the refuse truck of FIG. 1 or FIG. 2, according to an exemplary embodiment.

Referring now to FIG. 4, among others, a perspective view of the cab 16 from the driver's side is shown according to an example embodiment. The cab 16 can include a display 330 and an ozone cabinet 402 also referred to as decontamination unit 402. The display 330, as described herein, is configured to display a singular video feed, stitched video feeds, graphical user interfaces, and/or a graphic depiction (e.g., 3D graphic depiction) of the refuse truck 10. The display can be a simple display, a touch screen display, etc. As shown in FIG. 4, the display 330 can be mounted in the passenger cab corner. In some embodiments, the display 330 is mounted to a pillar of the cab 16. In some embodiments, the display 330 can be mounted in other positions throughout the cab 16. For example, the display 330 may be mounted to a ceiling of the cab 16 such that the display is in a position similar to that of a rear-view mirror (upper central portion of the windshield). These are example configurations and there are many other possible locations and configurations of the display 330.

In some embodiments, an ozone cabinet 402 may be located beneath passenger seats in the cab 16. In one embodiment, the ozone cabinet 402 is accessible by pivoting a seat portion of the passenger seats upwards towards the dashboard or upwards towards the rear of the cab 16. In one embodiment, the ozone cabinet 402 may be slidably connected to the floor of the cab 16 allowing the ozone cabinet 402 to be pulled out from beneath the passenger seats. In some embodiments the ozone cabinet 402 may require a user to press a button or unlatch the ozone cabinet 402 prior to pulling out from beneath the passenger seats such that the ozone cabinet 402 does not slide open during normal operation of the refuse truck 10.

Figure 5:
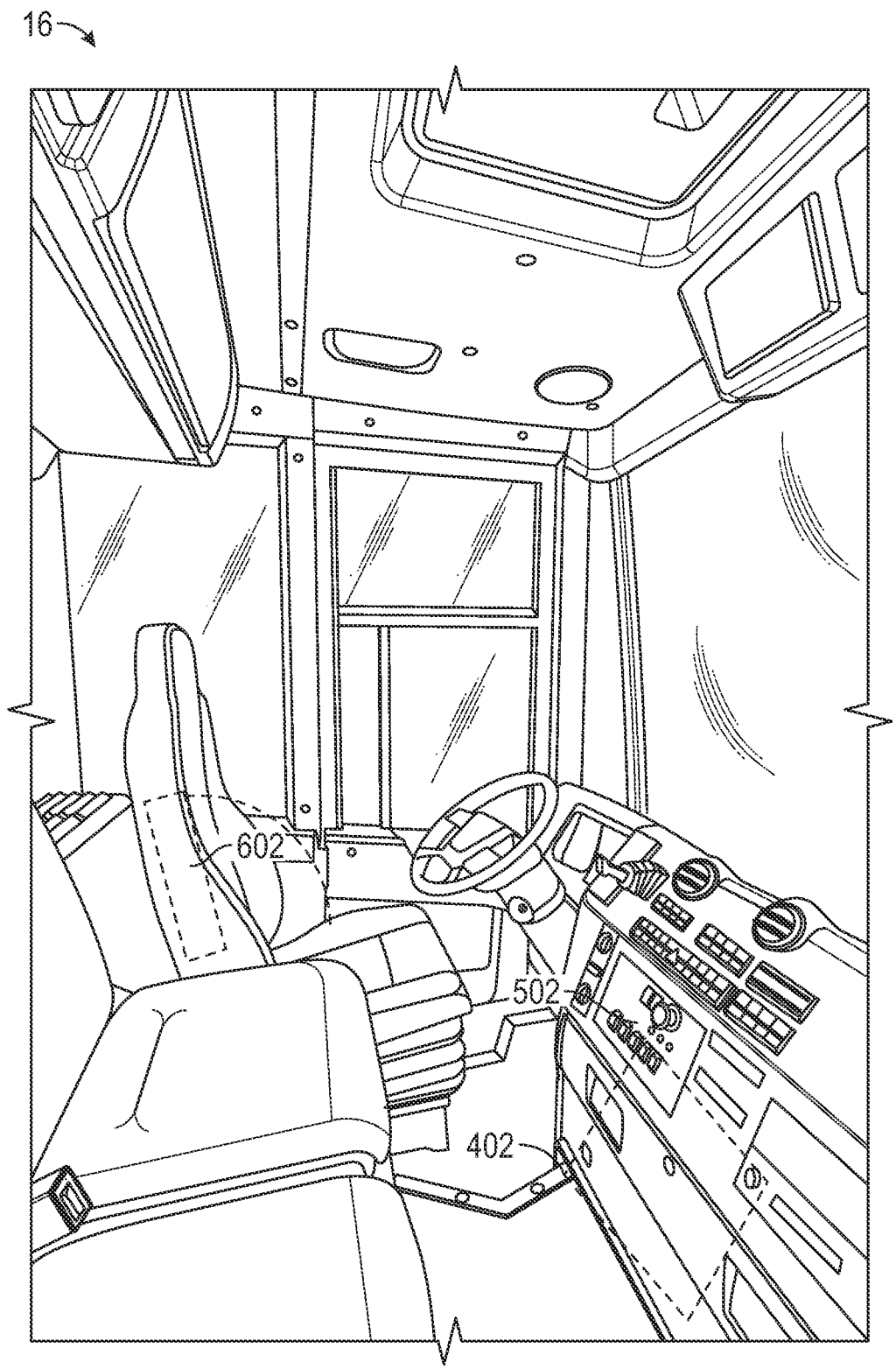
FIG. 5 is a perspective view of a cab interior of the refuse truck of FIG. 1 or FIG. 2, according to an exemplary embodiment.

In some embodiments, the ozone cabinet 402 may be integrated into the cab 16, as shown in FIG. 5. In these instances, the ozone cabinet 402 can include a single door or a set of doors that swing or slide open allowing the user to add or remove items (e.g., operator tools, gloves, hats) from the ozone cabinet 402. In some embodiments, the ozone cabinet 402 is slidably connected to the floor of the cab 16 allowing the ozone cabinet 402 to be pulled out from the dashboard of the cab 16. In some embodiments the ozone cabinet 402 may require a user to press a button or unlatch the ozone cabinet 402 prior to pulling out such that the ozone cabinet does not slide open during normal operation of the refuse truck 10.

According to an exemplary embodiment, the ozone cabinet 402 is configured to facilitate decontaminating at least one of a space (e.g., the cab 16, ozone cabinet 402), gear, and equipment. Advantageously, the ozone cabinet 402 may facilitate treating gear and equipment on the refuse truck 10 quickly, therefore eliminating the need for multiple sets of equipment for each user. Additionally or alternatively, the ozone cabinet 402 may advantageously facilitate treating the interior of the cab 16 of refuse truck 10 (or other types of vehicles) where carcinogens and/or other harmful contaminants can build up over time.

In some embodiments, the ozone cabinet 402 is configured to implement a decontamination process that uses ozone, moist/humidified air, and/or ultraviolet light to break down such dangerous compounds into harmless carbon dioxide, water, and/or chloride salts. Ozone is a pale blue gas that is generated naturally in the upper atmosphere, but can also be generated using specifically designed devices. There really is no practical way to store Ozone such that it must be generated as needed (i.e., because of its high reactivity). Regular oxygen that we breathe consists of two oxygen atoms bound together, and is represented as $O_2$. Ozone is related to oxygen, but it has three oxygen atoms bound together, and is represented as $O_3$. Ozone can be visualized as a regular oxygen molecule that has a very energetic, active, and excited companion, a single oxygen atom. Atomic oxygen ($O_1$) does not like to be alone and tries to use its energy to find a partner to bond or interact with. As a result, atomic oxygen will react with just about anything on contact. The atomic oxygen within ozone cannot be stable until it moves away from the $O_2$ molecule and forms a molecule with something else. If the atomic oxygen cannot find anything, it will eventually react with another oxygen atom that is in the same situation and they will stabilize each other, forming regular oxygen ($O_2$).

Accordingly, the ozone cabinet 402 is configured to implement a decontamination process to treat and break down extremely harmful pollutants with generated ozone, moisture, and/or ultraviolet light into carbon dioxide, water, and/or sodium chloride (i.e., table salt). In some embodiments, the ozone cabinet 402 is structured similarly to the ozone system described in U.S. Patent Publication 2019-0175971.

Referring now to FIG. 5, among others, a perspective view of the cab 16 from a passenger's side is shown according to an example embodiment. The cab 16 includes an ozone cabinet 402, dashboard controls 502, and an armrest 602. The dashboard controls 502 can include any number of finger switches, buttons, touch screens, toggles, joysticks, dials, etc. used to provide operator input for the actuation of the actuatable components of the refuse truck 10 (e.g., lifting system 40, lifting system 50, collection container 30, tailgate 34). In some embodiments, dashboard controls 502 can be used to activate or deactivate the pendent control 26, as described herein. In some embodiments, the dashboard controls 502 can be used to activate or deactivate the armrest controls 604. The dashboard controls 502 can be connected to the controller 310 via a wired connection and/or a wireless connection (e.g., Bluetooth, radio frequency, near field communication, network connection).

As shown in FIG. 5, the armrest 602 including armrest controls 604 can be positioned on the side of the driver's seat nearest the center of the cab 16. In some embodiments, the armrest 602 including armrest controls 604 can be positioned on the side of the driver's seat nearest the driver's side window. As shown in FIG. 5, the armrest 602 is pivotable between an inactive position (e.g., vertical) as shown and an active position (e.g., horizontal). In some embodiments, the armrest 602 is pivotably connected to the dashboard, as described herein. In some embodiments, the armrest 602 can be pivotably connected to a mount on a back wall of the cab 16. In some embodiments, the armrest 602 can be pivotably connected to a mount on the floor of the cab 16. These are example configurations and many other possible mounting positions of the armrest 602 are possible. As shown in FIG. 4 and FIG. 5, the cab 16 of the refuse truck 10 can be structured to include a number of storage containers and provide space for the operator to egress through the cab 16.

Figure 6:
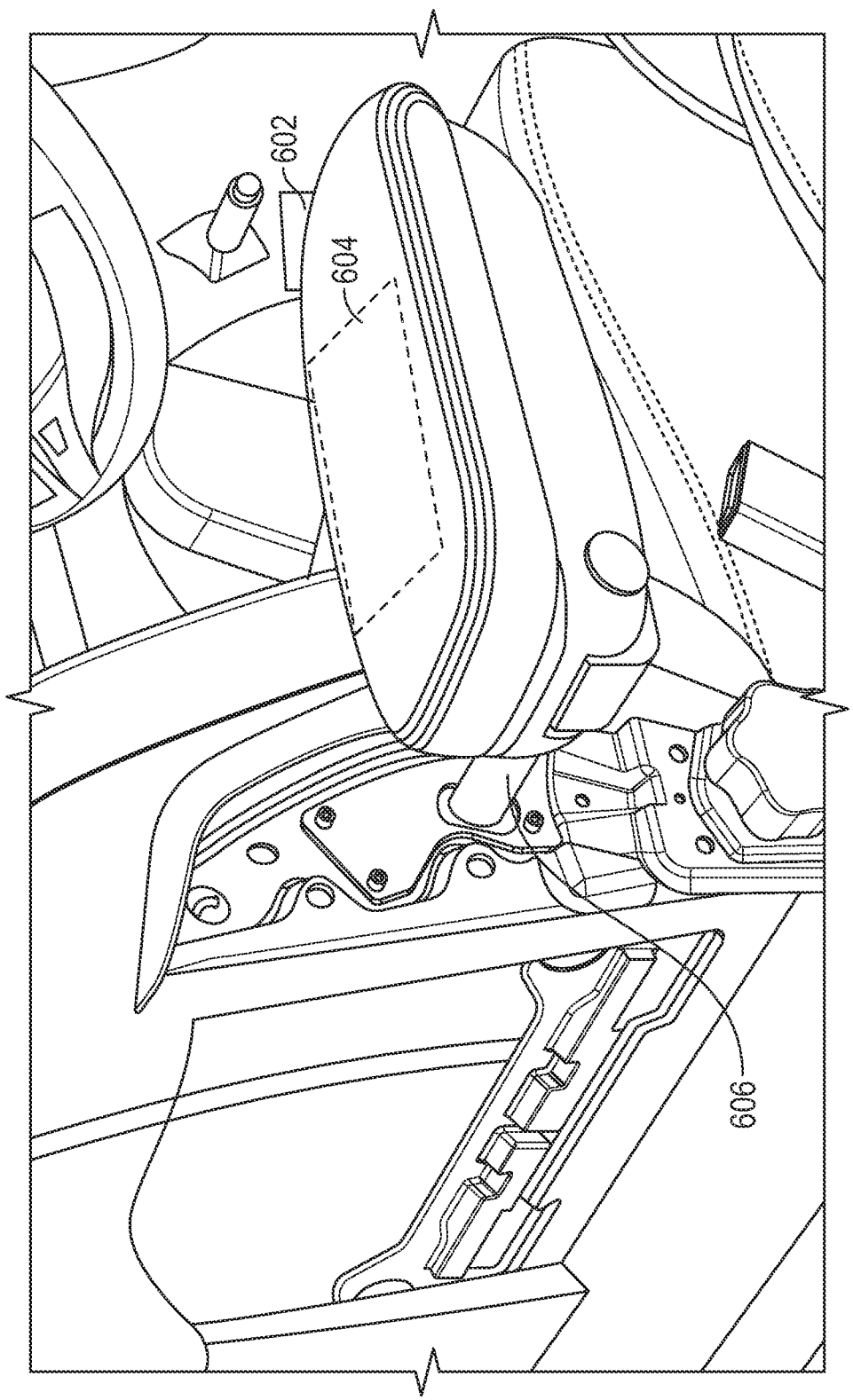
FIG. 6 is a perspective view of an armrest controller for the refuse truck of FIG. 1 or FIG. 2, according to an exemplary embodiment.

Referring now to FIG. 6, among other, an armrest 602 pivotably connected to a driver's seat is shown according to an example embodiment. The armrest 602 is pivotably connected to the driver's seat by a pivot arm 606 extending outward from a side of the driver's seat. The armrest 602 can be pivoted to a vertical position allowing the operator to egress through the walk through cab. In some embodiments the pivot arm 606 houses the one or more armrest position sensors. The pivot arm 606 is structured to allow the armrest

602 to be pivoted from an active position (e.g., horizontal) as shown, to an inactive position (e.g., vertical). As described herein, the armrest position sensor can include a rotary sensor (e.g., to determine an angle of the armrest 206), an infrared position sensor, a button or switch engaged when in a particular position (e.g., active, inactive).

In some embodiments, the pivot arm can comprise an internal ratchet or latches such that the armrest 602 is secured in the active or inactive positions. In some embodiments, the armrest 602 can include a button or latch to disengage the armrest from a fixed position (e.g., active, inactive).

The armrest controls 604, as described herein can include any number of finger switches, buttons, touch screens, toggles, joysticks, dials, etc. used to provide operator input for the actuation of the actuatable components of the refuse truck 10 (e.g., lifting system 40, lifting system 50, collection container 30, tailgate 34). In some embodiments, the armrest controls 604 can be used to activate or deactivate the pendent control 26.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the refuse truck as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse truck, comprising:
   a chassis;
   a body coupled to the chassis;
   a lift assembly coupled to at least one of the chassis or the body;
   a pendent control arranged on an exterior of the body and configured to selectively control operation of the lift assembly;
   a cab coupled to the chassis and positioned in front of the body, the cab comprising:
      an armrest pivotable between an active position and an inactive position, the armrest comprising armrest controls that are configured to selectively control operation of the lift assembly;
      an armrest position sensor configured to sense a position of the armrest between the active position and the inactive position; and
      a user interface; and
   a controller including a processor and memory, the controller is in communication with the lift assembly, the user interface, and the armrest position sensor and is configured to:
      control the user interface to provide an indication of a current position of the lift assembly;
      determine, via the armrest position sensor, a position of the armrest;
      activate the pendent control and deactivate the armrest controls, in response to determining that the armrest is in the inactive position; and
      deactivate the pendent control and activate the armrest controls, in response to determining that the armrest is in the active position.

2. The refuse truck of claim 1, wherein the cab includes an ozone cabinet configured to facilitate decontaminating at least one of an area of the cab and equipment positioned within the cab.

3. The refuse truck of claim 1, wherein the controller is further configured to receive a control signal from the pendent control and, in response, adjust the lift assembly between an extended position and a retracted position.

4. The refuse truck of claim 1, wherein the indication is a three-dimensional display of the refuse truck.

5. The refuse truck of claim 1, further comprising a plurality of collision avoidance sensors positioned on the exterior of the refuse truck, the plurality of collision avoidance sensors configured to determine a distance between the exterior of the refuse truck and an external object.

6. The refuse truck of claim 5, wherein the lift assembly is selectively repositionable between an extended position and a retracted position; and
wherein at least one of the plurality of collision avoidance sensors are selectively deactivated based on the current position of the lift assembly.

7. The refuse truck of claim 1, further comprising a camera operably coupled to the controller and mounted between the body and the cab, the camera configured to monitor a refuse accumulation in a collection compartment.

8. The refuse truck of claim 1, further comprising a camera operably coupled to the controller and mounted on a passenger side of the cab, the camera configured to monitor a position of the lift assembly.

9. A vehicle, comprising:
a chassis;
a body assembly coupled to the chassis and defining a front portion and a rear portion; and
a cab coupled to the chassis proximate the front portion of the body assembly, the cab comprising:
an armrest pivotable between an active position and an inactive position, the armrest comprising armrest controls that are configured to selectively control operation of a lift assembly;
an armrest position sensor configured to determine a position of the armrest between the active position and the inactive position; and
a pendent control positioned on an outer wall of the body assembly, proximate the rear portion;
wherein the pendent control is activated and the armrest controls are deactivated, when the armrest is in the inactive position, and the pendent control is deactivated and the armrest controls are activated, when the armrest is in the active position.

10. The vehicle of claim 9, the cab further comprising an ozone cabinet arranged under a seat within the cab and configured to facilitate decontaminating equipment positioned within the ozone cabinet.

11. The vehicle of claim 9, further comprising a controller including a processor and memory, the controller is in communication with the armrest position sensor and is configured to:
control a user interface to provide an indication of a current position of the lift assembly;
determine a position of the armrest; and
selectively activate or deactivate a pendent control and the armrest controls based on a position of the armrest.

12. The vehicle of claim 11, wherein the controller is further configured to receive a control signal from the pendent control and, in response, adjust a lift assembly between an extended position and a retracted position.

13. The vehicle of claim 9, further comprising a plurality of collision avoidance sensors positioned on an exterior of the vehicle, the plurality of collision avoidance sensors configured to determine a distance between the exterior of the vehicle and an external object.

14. The vehicle of claim 13, further comprising a lift assembly coupled to one of the chassis or the body assembly;
wherein the lift assembly is selectively repositionable between an extended position and a retracted position; and
wherein at least one of the plurality of collision avoidance sensors are selectively deactivated based on a current position of the lift assembly.

15. A cab for a vehicle, comprising:
a seat;
an ozone cabinet arranged under the seat and configured to facilitate decontaminating equipment positioned within the ozone cabinet;
an armrest pivotable between an active position and an inactive position, the armrest comprising controls;
an armrest position sensor configured to sense a position of the armrest between the active position and the inactive position;
a pendent control positioned on an outer wall of the vehicle, wherein the pendent control is activated when the armrest is determined to be in the inactive position and the pendent control is deactivated when the armrest is determined to be in the active position; and
a plurality of cameras mounted on an exterior of the cab, the plurality of cameras configured to determine a status of the vehicle, the plurality of cameras comprising:
a first camera mounted between a vehicle body and the cab and configured to monitor a refuse accumulation in a collection compartment; and
a second camera mounted on a passenger side of the cab and configured to monitor a position of a lift assembly.

16. The cab of claim 15, wherein the vehicle further comprises a controller including a processor and memory, the controller is in communication with the armrest position sensor, the first camera, and the second camera and is configured to:
control a user interface to provide an indication of a current position of the lift assembly;
determine a position of the armrest; and
selectively activate the pendent control based on the position of the armrest.

17. The cab of claim 15, further comprising a plurality of collision avoidance sensors positioned on the exterior of the vehicle, the plurality of collision avoidance sensors configured to determine a distance between the exterior of the cab and an external object;
wherein the lift assembly is selectively repositionable between an extended position and a retracted position; and
wherein at least one of the plurality of collision avoidance sensors are selectively deactivated based on a current position of the lift assembly.

* * * * *